United States Patent [19]

Müller et al.

[11] Patent Number: 5,019,638

[45] Date of Patent: May 28, 1991

[54] RAPIDLY SETTING, MOISTURE-CURABLE HOT MELT ADHESIVES AND THEIR USE

[75] Inventors: Hartmut Müller, Troisdorf; Klaus Brüning, Bergisch Gladbach, both of Fed. Rep. of Germany

[73] Assignee: Huels Aktiengesellschaft, Troisdorf, Fed. Rep. of Germany

[21] Appl. No.: 384,406

[22] Filed: Jul. 24, 1989

[30] Foreign Application Priority Data

Aug. 11, 1988 [DE] Fed. Rep. of Germany ....... 3827224

[51] Int. Cl.$^5$ .............................................. C09G 18/32
[52] U.S. Cl. ...................................... 528/83; 528/58; 525/420.5; 525/92; 428/336
[58] Field of Search .................... 528/83, 58; 428/336, 428/480; 525/420.5, 92

[56] References Cited

U.S. PATENT DOCUMENTS

| | | | |
|---|---|---|---|
| 4,443,518 | 4/1984 | Martins et al. | 428/336 |
| 4,548,996 | 10/1985 | Donermeyer et al. | 525/420.5 |
| 4,581,410 | 4/1986 | Donermeyer et al. | 525/92 |
| 4,689,385 | 8/1987 | Mac Phee et al. | 528/83 |
| 4,853,267 | 8/1989 | Lu et al. | 528/83 |

Primary Examiner—John Kight, III
Assistant Examiner—Dvc Truong
Attorney, Agent, or Firm—Felfe & Lynch

[57] ABSTRACT

Hot melt adhesives with particularly high setting rates are obtained from the reaction products of polyisocyanates and hydroxypolyesters, the hydroxypolyester preferably being strictly aliphatic and containing at least 12 methylene groups in the polyester unit of diol and dicarboxylic acid.

10 Claims, No Drawings

RAPIDLY SETTING, MOISTURE-CURABLE HOT MELT ADHESIVES AND THEIR USE

FIELD OF THE INVENTION

This invention relates to hot melt adhesives with a particularly high setting rate which are obtained from reaction products of polyisocyanates and hydroxypolyesters, where the hydroxypolyesters are preferably purely aliphatic and contain at least 12 methylene groups in the polyester unit of diol and dicarboxylic acid.

BACKGROUND OF THE INVENTION

To improve the shear resistant of hot melt adhesives at elevated temperatures, reactive adhesive systems are used which are either cross-linked by supplying energy or cured by means of moisture to form an infusible adhesive.

Reactive, moisture-curable hot melt adhesives of the isocyanate-functional polymer type are known, for example from German Offenlegungsschrift 2,401,320, Published European Application 0 107 097 and Published European Application 0 125 009. The polymers are predominantly polyesters of adipic acid, 1,4-butanediol and 1,6-hexanediol.

For many applications, it is necessary that the reactive hot melt adhesives set rapidly after application, so as to make immediate further processing possible. However, this is difficult to achieve with known hot melt adhesives. An improved, that is, a shorter setting time requires additives such as resins or thermoplastic polymers. Liquid isocyanate prepolymers are combined according to Published European Application 0 232 055 with ethylene/vinyl acetate copolymers or ethylene/methylstyrene resins, according to Published European Application 0 107 097 with thermoplastic polyurethanes or condensation resins, and according to Published European Application 0 246 473 with acrylate oligomers. After being cross-linked by the humidity of the air, such reactive hot melt adhesive still contain high proportions of thermoplastic resins, which disadvantageously affect the shear resistance at elevated temperatures.

While hot melt adhesives disclosed in Published European Application 0 248 658, which contain polyesters with more than 50% aromatic dicarboxylic acid instead of aliphatic dicarboxylic acid, have an improved setting rate, such products have the disadvantage of a melt viscosity that is too high. This causes problems during the preparation of the prepolymers and while processing the hot melt adhesives. Moreover, because they contain aromatic dicarboxylic acids, the glass transition temperature of these hot melt adhesives is increased substantially, which leads to a lower elasticity of the adhesive bond after cross-linking.

OBJECT OF THE INVENTION

It is an object of the invention to provide highly elastic, moisture curable hot melt adhesives, which ensure rapid setting after application without additions of polymers and/or resins. Short setting times of so-called reactive hot melts, which are solvent-free in the present case, then make it possible to achieve a high cycle rate in the standard production and to remove the immobilizing device after a short time.

DESCRIPTION OF THE INVENTION

The object of the invention is achieved by providing hot melt adhesives consisting of the reaction products of polyisocyanates and hydroxypolyesters, which are characterized by partially crystalline polyesters containing exclusively aliphatic dicarboxylic acids of the formula

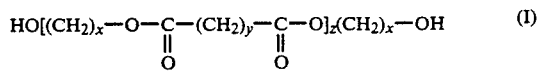

$$HO[(CH_2)_x-O-\underset{O}{\underset{\|}{C}}-(CH_2)_y-\underset{O}{\underset{\|}{C}}-O]_z(CH_2)_x-OH \quad (I)$$

in which $x+y=12$ to 26 or alternatively $y=18$ to 12 or $x=6$ to 18 and $z=3$ to 50, and the ratio of the reaction of OH: NCO groups is selected to be between 1:1.2 and 1:3.0, preferably between 1:1.5 and 1:2.5.

The hydroxypolyesters within the scope of the present invention have hydroxyl numbers from 5 to 100, preferably from 10 to 50, and acid numbers less than 5, preferably less than 2 and especially less than 1.

It is of decisive influence on the setting rate that the polyesters contain aliphatic dicarboxylic acids with 8, 10 or 12 methylene groups, that is, decane dicarboxylic acid, dodecane dicarboxylic acid or tetradecane dicarboxylic acid, dodecane discarboxylic acid being especially preferred. Preferably, at least 20 and particularly at least 50 mol percent of the dicarboxylic acids should be dodecane dicarboxylic acid, and z is preferably 6 to 20.

The nature of the aliphatic diols is essentially immaterial, but diols with 6 to 12 methylene groups are preferred. If dicarboxylic acids in which y is at least 10 are used, surprisingly short setting times are obtained even with short-chain diols where $x=2$ or 4 (see Example 4).

The diols may also be present as ether diols, that is, oligomers or polymers based, for example, on ethylene glycol or 1,4-butanediol, although they are not preferred. If ether diols are present, their proportion should not constitute more than 50 mol percent of the diols.

The sum $x+y$ of the methylene groups of the polyester unit of dicarboxylic acids and diols should be 12 or higher, but preferably not more than 26.

The hot melt adhesives of this invention should not contain any of the known additives, that is, monofunctional compounds such as alkanols or monoamines, other polymers or resins, etc. In particular, monofunctional compounds, such as alkanols or monoamines, are to be avoided.

However, fillers, catalysts, anti-aging agents and adjuvants, which are not polymers, may be present.

We have discovered that the setting rate increases quite significantly, if the selection of values is made pursuant to the invention, where the chain length $x+y$ plays a decisive role and the chain length y of the dicarboxylic acids plays a secondary role. Compared to other hot melt adhesives based on aliphatic polyesters with a different chain length, the setting rate increases to optimum values ranging from 1 to 5 and preferably 1 to 3 seconds. Thus, the setting rate is increased 5- to 20-fold (see the Table of the Examples).

Further aspects of the present invention are hot melt adhesives, the polyester of which contains more than 50% by weight, and optionally more than 75% by weight, of the polyester of the formula I, the balance being any desired polyester. Also with such polyester mixtures, the setting time is shortened significantly by the presence of the polyester of the formula I (Example 7, Comparison Example 4).

Still further aspects of the present invention are hot melt adhesives based on polyesters of the formula I, in which the aliphatic dicarboxylic acids are replaced up to 80 and preferably up to 50 mol percent (of the total) by aromatic dicarboxylic acids (Example 6, Comparison Example 3). The melting point of these mixed polyesters containing aromatic dicarboxylic acids is below 95° C., preferably below 90° C. A shortened setting time is achieved by the content of long-chain aliphatic polyester building blocks. The aromatic dicarboxylic acids increase the adhesive strength, for example to metals.

The degree of conversion of the polyisocyanates is in the usual range, that is, the ratio of hydroxyl groups of the polyester to NCO groups should generally be 1:1.2 to 1:3.0, preferably 1:1.5 to 1:2.5.

Aromatic as well as aliphatic or cycloaliphatic diisocyanates or higher functional or polymeric polyisocyanates, which are generally known, may be used as polyisocyanates. The present hot melt adhesives do not contain any solvent, so that after application the evaporation of solvents in technically complicated drying tunnels can be omitted. In general, the application is carried out at temperatures of 80° to 150° C.

Due to the rapid recrystallization in the adhesive after application from the melt, the setting rate is very fast compared to already known hot melt adhesives. For this reason, the adhesives of the instant invention are suitable especially for those applications in which a high elasticity of the adhesive bond is required and the substrates which are joined together are to be further processed immediately. Examples of such application are found in the shoe industry, the wood processing industry, the paper industry and the metal processing industry.

It is therefore possible to apply the hot melt adhesives of the instant invention, which contain reaction products of polyioscyanates and hydroxypolyesters, in a hot melt adhesive method in the absence of solvents and diluents at an elevated temperature on a flat substrate and, because of very rapid curing or cross-linking by the moisture of the air without thermal drying, to obtain these in a ready-to-use state without a drying step and without any waiting time.

To measure the setting rate, the hot melt adhesive is applied thinly from the melt at 120° C. on a square piece of wood with an area of 25×25 mm and immediately joined, that is, glued to a second square piece of wood of the same base area. The setting time is the time span over which the two pieces of wood can be shifted relative to one another by means of strong finger pressure. The less the time span, the more advantageous is the setting behavior of the hot melt adhesive.

The following examples illustrate the present invention and will enable others skilled in the art to understand it more completely. It should be understood, however, that the invention is not limited solely to the particular examples given below.

EXAMPLES 1 TO 6 AND COMPARISON EXAMPLES 1 TO 3

In a 3-neck, round bottom flask, 1 mol of various polyester having the composition given in Table 1 and a hydroxyl number of 30, were melted and degassed for 15 minutes by means of a vacuum. Thereafter, 2.2 mols of 4,4'-methylenediphenyldiisocyanate (MDI) were added, and the mixture was homogenized. To complete the reaction, the reactants were stirred for 2 hours at 120° C. under exclusion of moisture. The course of the reaction was monitored by determining the NCO values. After completion of the reaction, this value is about 2% by weight.

TABLE 1

Composition of the basic polyester and its properties after reaction with MDI in a ratio of OH:NCO of 1:2.2

| Example No. | Composition | | | | | | | | $(CH_2)_n$ n = | Setting Time sec. | FP (°C.) | $V_{130}$ Pa × sec. |
|---|---|---|---|---|---|---|---|---|---|---|---|---|
| | TPS | AD | DS | DDS | MEG | BD | HD | ND | | | | |
| Comparison Example 1 | | 100 | | | | 100 | | | 8 | 20 | 62 | 17 |
| Comparison Example 2 | | 100 | | | | | 100 | | 10 | 15 | 65 | 9 |
| Example 1 | | 100 | | | | | | 100 | 13 | 10 | 68 | 20 |
| Example 2 | | | 100 | | | | 100 | | 14 | 3 | 68 | 9 |
| Example 3 | | | | 100 | | | 100 | | 16 | 1 | 74 | 11 |
| Example 4 | | | | 100 | 100 | | | | 12 | 2 | 88 | 7 |
| Example 5 | | 50 | 50 | | | | 100 | | 13 | 10 | 58 | 13 |
| Comparison Example 3 | 60 | 40 | | | | | 100 | | 7.6 | 40 | 96 | 50 |
| Example 6 | 40 | | 60 | | | | 100 | | 12 | 20 | 88 | 42 |

TPS = terephthalic acid
AD = adipic acid
DS = decane dicarboxylic acid
DDS = dodecane dicarboxylic acid
MEG = monoethylene glycol
BD = 1,4-butanediol
HD = 1,6-hexanediol
ND = 1,9-nonanediol
n = number of the methylene groups per polyester unit of Formula (I)
FP = flow point (ring and ball) of DIN 52 011
$V_{130}$ = melt viscosity at 130° C. (Brookfield)

If in Table 1 Examples 1 to 5 are compared with Comparison Examples 1 and 2, it is seen that the setting rate decreases greatly as the number of methylene groups per polyester unit increases. Particularly conspicuous are the very short setting times of polyesters which contain at least 12 methylene groups per polyester unit.

A comparison of polyesters which contain aromatic dicarboxylic acids shows that the setting rate is also decreased by replacing adipic acid with dicarboxylic acids of longer chain length (Comparison Example 3, Example 3).

COMPARISON EXAMPLE 4

The polyester of Comparison Example 1 was mixed with a polyester composed of terephthalic acid, isophthalic acid and adipic acid in the ratio of 50:40:10, and monoethylene glycol and neopentyl glycol in the ratio of 50:50 (hydroxyl number=30) in a weight ratio of 8:2 and reacted with MDI in the ratio of OH:NCO of 1:2.2 to form a reactive hot melt adhesive. The setting time of this hot melt adhesive was 50 seconds.

EXAMPLE 7

When the polyester of Comparison Example 1 is replaced in Comparison Example 4 by the polyester of Example 3, a product with significantly shorter setting time of 2 seconds was obtained.

EXAMPLES 8 AND 9

As in Example 3, 1 mol of polyester was reacted with 1.5 mols of MDI. The NCO content after the reaction was of the order of 1% by weight (Example 8). Upon reacting 1 mol of polyester with 2.5 mols of MDI, the NCO content after the reaction was of the order of 2.5% by weight (Example 9).

EXAMPLES 10 AND 11

Examples 3 was repeated. In the polyester, however,
a) 20 mol percent of the hexanediol was replaced by polybutylene glycol ($M_w$=650) (Example 10),
b) 15 mol percent of the hexanediol was replaced by triethyelene glycol (Example 11).

The setting rates of the reaction product were of the order of 3 seconds.

While the present invention has been illustrated with the aid of certain specific embodiments thereof, it will be readily apparent to those skilled in the art that the invention is not limited to these particular embodiments, and that various changes and modifications may be made without departing from the spirit of the invention or the scope of the appended claims.

We claim:

1. A hot melt adhesive consisting essentially of the reaction product of a polyisocyanate and a hydroxypolyester, where said hydroxypolyester is a partially crystalline polyester containing exclusively aliphatic dicarboxylic acids of the formula

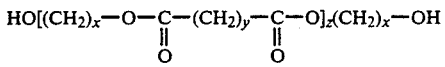

in which $x+y=12$ to 26 and $z=3$ to 50, and the ratio of OH groups to NCO groups is from 1:1.2 to 1:3.0.

2. A hot melt adhesive of claim, where the ratio of OH groups to NCO groups is from 1:1.5 to 1:2.5.

3. A hot melt adhesive of claim 1, wherein up to 80 mol percent of the total dicarboxylic acids are replaced by aromatic dicarboxylic acids.

4. A hot melt adhesive of claim 1, wherein up to 50 mol percent of the total dicarboxylic acids are replaced by aromatic dicarboxylic acids.

5. A hot melt adhesive of claim 1, wherein $x+y$ is equal to or greater than 14.

6. A hot melt adhesive of claim 1, wherein $y=8$ to 12.

7. A hot melt adhesive of claim 1, wherein $x=6$ to 18.

8. A hot melt adhesive of claim 1, wherein $(CH_2)_x$ is completely or partly replaced by ether diol groups.

9. A hot melt adhesive consisting essentially of the reaction product of a polyisocyanate and a polyester mixture, wherein the polyester mixture contains more than 50% by weight of partially crystalline hydroxypolyesters containing exclusively aliphatic dicarboxylic acids of the formula
in which $x+y=12$ to 26 and $z=3$ to 50, and the ratio of OH groups to NCO groups is from 1:1.2 to 1:3.0.

10. A hot melt adhesive of claim 1, which additionally contains fillers, catalysts, anti-aging agents or other adjuvants.

* * * * *

UNITED STATES PATENT AND TRADEMARK OFFICE
CERTIFICATE OF CORRECTION

PATENT NO. : 5,019,638
DATED : May 28, 1991
INVENTOR(S) : Hartmut Müller et al It is certified that error appears in the above-identified patent and that said Letters Patent is hereby corrected as shown below:

Column 6, line 37, after "formula" insert $$--HO\,[\,(CH_2)_x - O - \underset{\underset{O}{\|}}{C} - (CH_2)_y - \underset{\underset{O}{\|}}{C} - O\,]_z\,(CH_2)_x - OH--$$

Signed and Sealed this

Twenty-ninth Day of December, 1992

*Attest:*

DOUGLAS B. COMER

*Attesting Officer*     *Acting Commissioner of Patents and Trademarks*